July 8, 1958     L. A. KROETSCHING     2,842,097
ANIMAL FOOD MIXER
Filed June 18, 1956
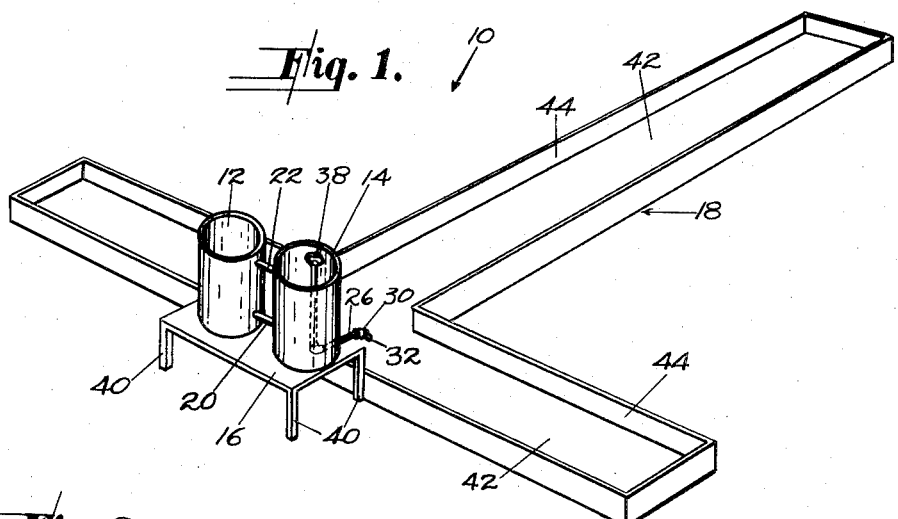
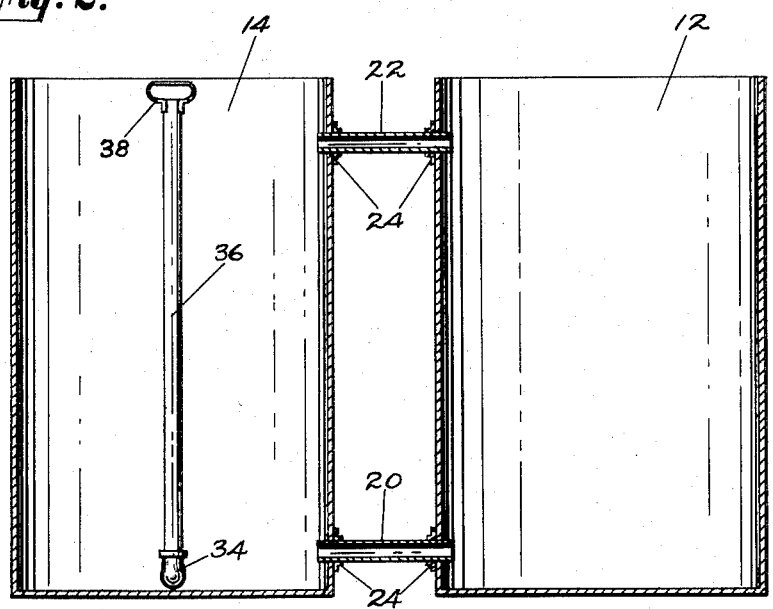
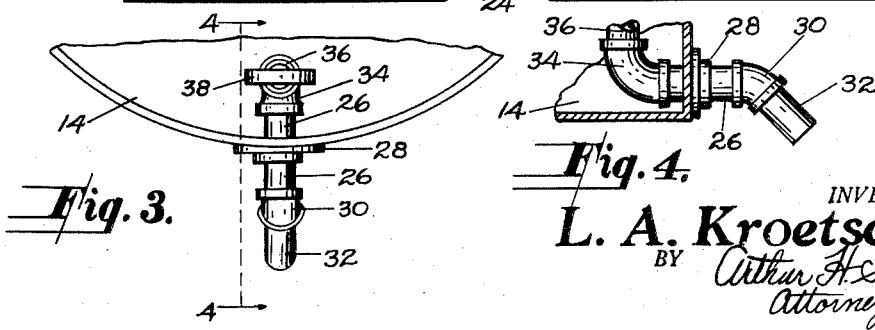
INVENTOR.
L. A. Kroetsching

United States Patent Office 2,842,097
Patented July 8, 1958

2,842,097

ANIMAL FOOD MIXER

Lester A. Kroetsching, Sharon Springs, Kans.

Application June 18, 1956, Serial No. 591,837

4 Claims. (Cl. 119—52)

This invention relates to feeding devices used on farms for animals, stock, hogs, and the like, and in particular a pair of feed mixing tanks in combination with a feed trough wherein hog feed, such as shorts, is thoroughly mixed with water by passing the mixture from one tank to another, and wherein the final product may readily be run into a feed trough as desired.

The purpose of this invention is to provide thorough mixing of feed shorts with water without mechanical means and also without the laborious task of mixing the feed by hand.

Mixing shorts for hog feed or "slops" is difficult because time should be permitted for the shorts to swell, and, in addition to the work involved in mixing the shorts with water there is considerable waste in dipping the mixture from a mixing tank and pouring the same into a trough with a bucket. With this thought in mind this invention contemplates a feed mixing device including a pair of tanks connected in such a manner that shorts and water deposited into one tank pass into the other tank to equalize the level, and wherein upon drawing the mixture from one tank into a trough the feed carried by the water rushes from the first tank into the tank from which the mixture is being drawn resulting in a swirling action whereby the shorts and water are thoroughly mixed.

The object of this invention is, therefore, to provide a feed mixing device in which the mixing action is effected by the passage of the mixture from one tank to another.

Another object of the invention is to provide a mixing device particularly adapted for hog feed in which the feed is adapted to flow from the mixing device to a feed trough by gravity.

Another important object of the invention is to provide a hog feed mixer in which overflow resulting from placing too much water in the mixer passes into a feed trough with which the mixer is connected.

A further object of the invention is to provide a feed mixer including a pair of tanks in which the ingredients are placed in one tank and flow through connections to the other tank, resulting in a swirling mixing action as the mixture passes from one tank to the other.

A still further object of the invention is to provide a pair of mixing tanks for animal feed in which thorough mixing of the feed is accomplished and in which the device is of a simple and economical construction.

With these and other objects and advantages in view the invention embodies a pair of tanks positioned in spaced relation upon a stand, tubes connecting upper and lower ends of the tanks, an outlet tube extended from one of the tanks to a feed trough, and an overflow tube positioned to close the outlet tube in the lower part of the tank, and adapted to be removed to open said outlet tube.

Other features and advantages of the invention will appear from the following description taken in connection with the drawings, wherein:

Figure 1 is a perspective view showing the two tanks of the feeder positioned to deposit mixed feed into a T-shaped trough, the tanks being mounted on a stand.

Figure 2 is a longitudinal section through the tanks showing the tubular connections between the tanks, and showing the device with the parts on an enlarged scale.

Figure 3 is a plan view, also with the parts shown on an enlarged scale showing a portion of one of the tanks in which the outlet connection is positioned, and also showing the overflow tube positioned in the outlet connection.

Figure 4 is a section taken on line 4—4 of Figure 3, showing the mounting of the outlet connection in the lower end of a tank.

While one embodiment of the invention is illustrated in the above referred to drawings, it is to be understood that they are merely for the purpose of illustration and that various changes in construction may be resorted to in the course of manufacture in order that the invention may be utilized to the best advantage according to circumstances which may arise, without in any manner departing from the spirit and intention of the device, which is to be limited only in accordance with the appended claims. And while there is stated the primary field of utility of the invention, it remains obvious that it may be employed in any other capacity wherein it may be found applicable.

In the accompanying drawings, and in the following specification, the same reference characters are used to designate the same parts and elements throughout, and in which the numeral 10 refers to the invention in its entirety, numeral 12 indicating a receiving tank, numeral 14 a mixing tank, numeral 16 a stand upon which the tanks are positioned, and numeral 18 a feed trough which is illustrated as being in the form of a T, although it will be understood that the trough may be of any suitable shape.

The tanks 12 and 14 are positioned in spaced relation and the lower ends connected by a lower tube 20 and the upper ends with an upper tube 22. The tubes are secured in the walls of the tanks with threaded connection or by welding as shown at the points 24.

As an illustration, and where thirty gallon tanks are used the tubes are two inches in diameter, and the upper tube is positioned four inches below the upper ends of the tanks and the lower tube two inches from the bottoms thereof.

The lower end of the mixing tank 14 is provided with an outlet connection including a nipple 26 which extends through the wall of the tank, and which is secured in the wall with a flange or collar 28. The outer end of the nipple is provided with an elbow 30, preferably of 45° and a discharge nipple 32 extends downwardly from the end of the elbow. The opposite end of the nipple 26, which is positioned on the inside of the tank, is provided with a right angle or 90° elbow 34 providing an upturned end in which the lower end of an overflow pipe 36 is freely positioned. With the overflow pipe in position, as shown in Figure 2, the outlet connection is closed, and with the upper end of the overflow pipe open the water level is controlled, as water extended above the upper end of the pipe flows through the pipe and into the feed trough 18 through the outlet connection. The upper end of the overflow pipe 36 is provided with a handle 38 by which the pipe is removed when it is desired to discharge the mixed feed in the tanks into the feed trough.

The stand 16, upon which the tanks are positioned, is provided with legs 40, and the feed trough includes a bottom 42, and a continuous flange or wall 44.

*Operation*

With the tanks positioned on a stand and connected as shown and described feed shorts are deposited into the tank 12 and as water is poured into the tank the shorts are washed through the lower tube 20 and into the tank 14. The shorts may be retained submerged to permit swelling, and after a predetermined period of time the overflow pipe 36 is removed and the mixture of shorts and water flushed through the outlet connection into the feed trough. As the mixture flows from the tank 14 the water and shorts flowing through the lower tube 20 from the tank 12 causes turbulence and, consequently, thorough mixing in the tank 14.

Should the water level approach the upper ends of the tanks in filling, it is drained off through the overflow pipe 36.

After use the pipe 36 is replaced and shorts and water are again placed in the receiving tank 12.

From the foregoing specification, it will become apparent that the invention disclosed will adequately accomplish the functions for which it has been designed and in an economical manner, and that its simplicity, accuracy, and ease of operation are such as to provide a relatively inexpensive device, considering what it will accomplish, and that it will find an important place in the art to which it apertains when once placed on the market.

It is thought that persons skilled in the art to which the invention relates will be able to obtain a clear understanding of the invention after considering the description in connection with the drawings. Therefore, a more lengthy description is regarded as unnecessary.

Changes in shape, size, and rearrangement of details and parts, such as come within the purview of the invention claimed may be resorted to in actual practice, if desired.

Having now described the invention that which is claimed to be new and desired to be procured by Letters Patent, is:

1. In a feed mixer, the combination which comprises a pair of tanks, a tube extended between and connecting the lower ends of the tanks, an upper tube extended between and connecting upper ends of the tanks, a nipple having a fitting on each end extended through the wall of one of the tanks providing a discharge connection, and an overflow pipe mounted in the fitting on the end of the nipple positioned in the tank, said overflow pipe being adapted to be removed to open the discharge connection.

2. In a mixer for feeding shorts, the combination which comprises a pair of vertically disposed tanks, a stand upon which the tanks are positioned, a tube connecting the lower ends of the tanks, an upper tube connecting upper ends of the tanks, a nipple extended through the wall of one of the tanks, an angularly disposed fitting positioned on the end of the nipple on the outside of the tank, a 90° fitting on the end of the nipple positioned on the inside of the tank, an overflow pipe having an open upper end positioned in the fitting on the inside of the tank and providing a closure therefor, said overflow pipe being adapted to be removed to open the connection through said nipple, and a feed trough positioned to receive feed from the angularly disposed fitting of the nipple.

3. In a mixer for feeding shorts, the combination which comprises a pair of vertically disposed tanks, a stand upon which the tanks are positioned, a tube connecting the lower ends of the tanks, an upper tube connecting upper ends of the tanks, a nipple extended through the wall of one of the tanks, a 45° elbow positioned on the end of the nipple on the outside of the tank, a 90° elbow mounted on the end of the nipple positioned in the tank, an overflow pipe positioned in the 90° elbow and extended upwardly to a point spaced from the upper end of the tank, the upper end of the overflow pipe being open and said overflow pipe being adapted to be removed to open a passage through the nipple and fittings, a handle on the upper end of the overflow pipe, and a feed trough positioned to receive feed from the 45° elbow.

4. In an animal food mixer, the combination which comprises a pair of tanks positioned in spaced relation, an upper tube extended between and connecting upper parts of the tanks, the upper tube being spaced downwardly from upper ends of the tanks, a lower tube extended between and connecting lower parts of the tanks, the lower tube being spaced upwardly from the lower ends of the tanks, a discharge connection extended through the wall of one of the tanks and spaced upwardly from the lower end thereof, the discharge connection being positioned in a horizontal plane spaced below a horizontal plane in which the lower tube is positioned, said discharge connection having an upturned inner end on the inside of the tank in which the connection is positioned and an angularly positioned downwardly disposed end on the outside of the tank, an overflow pipe having a handle on the upper end freely positioned in the upturned end of the discharge connection providing providing a closure for said connection, the overflow pipe being removable for opening said discharge connection, a trough positioned to receive feed from the discharge connection, and a stand upon which the tanks are mounted whereby the tanks are elevated in relation to the trough.

References Cited in the file of this patent

UNITED STATES PATENTS

| | | |
|---|---|---|
| 636,681 | Morrison | Nov. 7, 1899 |
| 1,238,771 | Howes | Sept. 4, 1917 |
| 1,751,456 | Gillespie | Mar. 18, 1930 |
| 2,384,900 | Duncan | Sept. 18, 1945 |